Patented Oct. 27, 1931

1,828,990

UNITED STATES PATENT OFFICE

PARKE H. WATKINS, OF LEONIA, AND ALBERT W. HOLMBERG, OF SOUTH ORANGE, NEW JERSEY, ASSIGNORS TO NATIONAL INDIA RUBBER COMPANY, OF BRISTOL, RHODE ISLAND, A CORPORATION OF RHODE ISLAND

METHOD OF MAKING RUBBER ARTICLES BY DEPOSITION

No Drawing. Application filed April 4, 1927. Serial No. 180,993.

This invention relates to an improved method for forming an article of rubber composition by depositing rubber composition from an aqueous dispersion upon a form of the required shape.

It is an object of this invention to provide a method of forming articles of rubber composition, which articles have localized thickened portions, by depositing the rubber from an aqueous dispersion of the same.

In the preferred embodiment of the invention, a form in the shape of the article, for instance, an overshoe, and made of filtering or porous material, for example, unglazed porcelain or earthenware, is immersed in an aqueous dispersion of rubber and allowed to remain in contact therewith for a sufficient interval of time to permit of the deposit of a layer of rubber composition of the thickness desired. In one example of the invention, rubber latex, the natural water emulsion of rubber obtained from the rubber trees, of a concentration of about 35% solid constituents by weight, is combined with various types of mineral fillers, softeners, vulcanizing ingredients, stabilizing agents, etc. A specific compound employing a semi-cured latex, which may be used in carrying out the invention is as follows:

Rubber as semicured latex containing 35% solids _____ 100 parts by weight
Zinc oxide _____ 2 parts by weight
Carbon black _____ ½ part by weight
Sulphur _____ 2 parts by weight
Zinc dimethylamine dithiocarbamate _____ ½ part by weight
Sulphonated vegetable oil _____ 5 parts by weight
Kaolin _____ 35 parts by weight
Asbestine _____ 15 parts by weight
Glue _____ 1 part by weight
Ammonium thiocyanate _____ .1 part by weight
Water _____ 60 parts by weight
Sodium polysulphide _____ .8 ccs. per 100 ccs. of compound In this composition, the kaolin and asbestine act as filling agents, the glue acts as a stabilizer for the dispersion, the sodium polysulphide functions as a thickener, and the ammonium thiocyanate aids in accomplishing the thickening. The carbon black serves as a coloring agent, while the zinc oxide aids in effecting vulcanization. It will be understood that other stabilizing, thickening, coloring and vulcanizing ingredients can be substituted for those above mentioned and that various of the above ingredients can be omitted depending upon the character of the article to be formed and the purpose for which it is to be used. The compound above described forms a dispersion of rubber containing approximately 45% solids and is adapted for use in constructing a rubber shoe.

In the operation of coating the form for a rubber shoe with rubber dispersion, the porous form is immersed in the composition above described, whereupon water is withdrawn from the dispersion adjacent the form through the pores of the latter effecting a segregation or collection of thickened dispersion adhering to the form. The withdrawal of water takes place toward the interior of the form while the latter is immersed and upon withdrawal thereof from the dispersion, elimination of water from the adherent mass takes place not only toward the interior but also by exterior evaporation. The form is withdrawn from the dispersion after the desired thickness of deposit has been obtained and can be dried at room temperature, whereupon a smooth coating of the deposited rubber composition of uniform thickness is left thereon free from runs and other imperfections.

Localized thickened portions can now be built upon the coating. This is accomplished by dipping a desired portion of the coated form, for instance, the sole or if a bead is to be constructed, then the upper section of the coated form, into the dispersion. Upon withdrawal from the dispersion, these portions of the form, are then immersed in a coagulating bath which serves to coagulate the rubber of the deposited dispersion. The coagulated rubber is then washed with water which is preferably kept nearly neutral by continual or complete replacement with fresh water. Preferably some of the coagulant is allowed to remain on the coagulated material to hasten the coagulation of the next layer of rubber. The form is again dipped into the dispersion, then into the coagulant and then into the wash water. This procedure of alternately dipping, coagulating and washing, whereby a thickened deposit of rubber composition is rapidly assembled, is repeated until a localized deposit of the desired thickness is obtained. A suitable coagulant for use in the above described process is composed of equal parts glacial acetic acid and water, but other coagulants may be used such as aqueous formaldehyde or other acids or aldehydes. After the final coagulation, the coated form can be washed in an alkaline solution if an acid coagulant has been used to neutralize any remaining coagulant and is then dried, or alternatively, drying alone can be resorted to to remove the excess coagulant. As a variation in the process, coagulation can be effected by the use of vapors of acetic acid or of formaldehyde. This method is of advantage for the reason that possibility of the formation of runs is eliminated.

If a further coating of rubber composition is desired upon the entire article, the form with its built up layers of rubber composition can be again immersed in the dispersion of rubber, withdrawn and dried to provide a final coating of a thin film of composition. An advantage of the method is that the main body of the article having a smooth surface and free from runs can be rapidly built up of a uniform thickness or with slightly varying thickness in a single dipping operation by the filtration step, and the localized thick portions can then be conveniently formed by alternate dipping and coagulating.

The article thus formed is subjected to vulcanization and for the composition described, this can be effected at from 1 to 1¼ hours at 212° to 220° F. It will be understood that the time and temperature of vulcanization will vary with the particular composition used.

The form upon which the rubber article is built can be constructed of any porous material which is capable of absorbing water by capillarity and which will permit of the removal of the built up article therefrom. Suitable forms are constructed of porous earthenware, fibrous composition such as paper, textile fabrics or felts, or they can be made of a composition containing porous or pore producing materials such as whiting, Tripoli flour, kieselguhr, clay, etc., bound together by a suitable binder such as hydrated paper pulp, phenol aldehyde concentration product, etc. The porous nature of various parts of the form can be varied so as to cause the deposit of a film of varying thickness.

The process is applicable to the manufacture of any article which is susceptible of being built up by deposition of rubber composition from an aqueous dispersion of the same. Such articles may be rubber shoes, gloves, footholds, etc. Some articles such as linemen's gloves are subjected to use for which they must be resistant to high voltage electricity. Then again an article may be constructed which must be primarily water resistant, or a combination of these qualities may be needed in the same article. In such a case it is contemplated to coagulate the original layer of rubber composition upon the porous form by the use of acetic acid, formic acid, formaldehyde, etc. If the deposited rubber composition is coagulated by immersing the same in liquid coagulant it is preferred to dry the outer surface thereof before coagulating. If coagulation is effected by vapors of coagulant the step of drying the surface of the deposit can be omitted. The deposit is subjected to the action of the coagulant until the entire thickness thereof or as much as may be desired has been coagulated. The building up of a article by a combination of the steps of depositing by means of a porous form and by acid coagulation results in an article having an improved quality and appearance.

Having thus described our invention, what we claim and desire to protect by Letters Patent is:

1. The method of making articles of rubber composition which comprises continuously building up a deposit of rubber composition on a porous form by maintaining the form in contact with a body of aqueous rubber dispersion and withdrawing the dispersing agent through the form, drying the deposit, building up additional deposits of rubber composition by alternately contacting localized portions of the deposit with a rubber dispersion and with coagulant, and vulcanizing.

2. The method of making articles of rubber composition which comprises continuously building up a deposit of rubber composition of a porous form by maintaining the form in contact with a body of aqueous rubber dispersion and withdrawing the dispersing agent through the form, building up additional deposits of rubber composition by alternately contacting localized portions of the deposit with a rubber dispersion and with coagulant, depositing an additional layer of rubber composition by contacting the previously formed article with rubber dispersion, drying and vulcanizing.

3. The method of making rubber articles which comprises building up the main body of the article by a continuous filtration deposit from an aqueous dispersion of rubber, drying the deposit, and building up a localized thickened portion on the main body by alternate deposit and coagulation of the dispersion on such portion.

4. The method of making rubber articles which comprises depositing a layer of rubber composition on a porous form by withdrawing the dispersing agent of an aqueous dispersion of rubber therethrough, drying the outer surface of the layer, partially at least coagulating the layer, building up localized thickened portions upon the deposit by alternate deposition of rubber composition from an aqueous dispersion of rubber and coagulation therof, and vulcanizing.

Signed at New York, N. Y., this 30th day of March, 1927.

PARKE H. WATKINS.

Signed at New York, N. Y., this 30th day of March, 1927.

ALBERT W. HOLMBERG.